(12) United States Patent
Sakai et al.

(10) Patent No.: US 12,517,253 B2
(45) Date of Patent: *Jan. 6, 2026

(54) LIGHT EMITTING DEVICE, OPTICAL DEVICE, AND INFORMATION PROCESSING APPARATUS

(71) Applicant: FUJIFILM Business Innovation Corp., Tokyo (JP)

(72) Inventors: Kazuhiro Sakai, Ebina (JP); Daisuke Iguchi, Ebina (JP); Yoshinori Shirakawa, Ebina (JP); Tomoaki Sakita, Ebina (JP); Michiaki Murata, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 1248 days.

This patent is subject to a terminal disclaimer.

(21) Appl. No.: 17/341,595

(22) Filed: Jun. 8, 2021

(65) Prior Publication Data

US 2021/0293966 A1    Sep. 23, 2021

Related U.S. Application Data

(63) Continuation of application No. PCT/JP2019/024547, filed on Jun. 20, 2019.

(30) Foreign Application Priority Data

Feb. 6, 2019    (JP) .................................. 2019-019975

(51) Int. Cl.
*G01S 7/481*    (2006.01)
*G01S 17/894*    (2020.01)
(Continued)

(52) U.S. Cl.
CPC ............ *G01S 17/894* (2020.01); *G01S 7/4811* (2013.01); *G06F 21/32* (2013.01); *H01S 5/0239* (2021.01)

(58) Field of Classification Search
CPC ...... G01S 17/894; G01S 7/4811; G01S 7/481; G06F 21/32; H01S 5/0239; H01S 5/42; G01B 11/24; H01L 31/02
(Continued)

(56) References Cited

U.S. PATENT DOCUMENTS 8,783,893 B1    7/2014 Seurin et al.
11,211,774 B2 *    12/2021 Sakai ................. G02B 27/4205
(Continued)

FOREIGN PATENT DOCUMENTS

CN    1779811 A    5/2006
CN    101170895 A    4/2008
(Continued)

OTHER PUBLICATIONS

Dec. 20, 2022 Office Action issued in Japanese Patent Application No. 2019-019975.
(Continued)

*Primary Examiner* — Daniel L Murphy
(74) *Attorney, Agent, or Firm* — Oliff PLC

(57) ABSTRACT

A light emitting device includes: a substrate; a light emitting element array provided on the substrate, the light emitting element array having first and second side surfaces facing each other, and third and fourth side surfaces facing each other and connecting the first and second side surfaces; a driving element provided on the substrate at a side of the first side surface and driving the light emitting element array; a light receiving element provided on the substrate at a side of the second side surface and receiving light emitted from the light emitting element array; and a wiring member provided
(Continued)

at a side of the third side surface and at a side of the fourth side surface and extending from an upper surface electrode of the light emitting element array toward an outside of the light emitting element array.

20 Claims, 5 Drawing Sheets

(51) Int. Cl.
  *G06F 21/32* (2013.01)
  *H01S 5/0239* (2021.01)
(58) Field of Classification Search
  USPC .................................................. 356/4.01
  See application file for complete search history.

(56) References Cited

U.S. PATENT DOCUMENTS

| | | | |
|---|---|---|---|
| 11,732,884 B2* | 8/2023 | Sakai | G06F 21/32 |
| | | | 250/200 |
| 11,973,321 B2* | 4/2024 | Sakai | H01S 5/02255 |
| 2006/0078021 A1 | 4/2006 | Fujihara et al. | |
| 2008/0102544 A1 | 5/2008 | Okada et al. | |
| 2013/0162973 A1 | 6/2013 | Kamiyama et al. | |
| 2013/0163626 A1 | 6/2013 | Seurin et al. | |
| 2013/0163627 A1 | 6/2013 | Seurin et al. | |
| 2013/0208753 A1 | 8/2013 | van Leeuwen et al. | |
| 2015/0069113 A1 | 3/2015 | Wang et al. | |
| 2015/0229912 A1 | 8/2015 | Masalkar et al. | |
| 2016/0259057 A1 | 9/2016 | Ito | |
| 2018/0031779 A1 | 2/2018 | Kimura | |
| 2018/0076598 A1 | 3/2018 | Moench et al. | |
| 2019/0033452 A1 | 1/2019 | Ito | |

FOREIGN PATENT DOCUMENTS

| | | | |
|---|---|---|---|
| CN | 103178442 A | 6/2013 |
| CN | 105992960 A | 10/2016 |
| CN | 108828562 A | 11/2018 |
| JP | 2008-244226 A | 10/2008 |
| JP | 2013-134173 A | 7/2013 |
| JP | 2017-084899 A | 5/2017 |
| JP | 2018-018887 A | 2/2018 |
| JP | 2018-508122 A | 3/2018 |
| JP | 2018-185342 A | 11/2018 |

OTHER PUBLICATIONS

Feb. 29, 2024 Office Action issued in Chinese Patent Application No. 201980088650.7.

Jul. 30, 2019 Search Report issued in International Patent Application No. PCT/JP2019/024547.

Jul. 30, 2019 Written Opinion issued in International Patent Application No. PCT/JP2019/024547.

* cited by examiner

LIGHT EMITTING DEVICE, OPTICAL DEVICE, AND INFORMATION PROCESSING APPARATUS

CROSS-REFERENCE TO RELATED APPLICATIONS

This is a continuation of International Application No. PCT/JP2019/024547 filed on Jun. 20, 2019, and claims priority from Japanese Patent Application No. 2019-019975 filed on Feb. 6, 2019.

BACKGROUND

1. Technical Field

The present invention relates to a light emitting device, an optical device, and an information processing apparatus.

2. Related Art

JP-A-2017-084899 discloses a surface emitting laser array having a light emitting region including plural light emitting portions formed by a surface emitting laser element including a lower reflecting mirror, a resonator region including an active layer, and an upper reflecting mirror, including: an electrode pad portion formed so as to surround the periphery of the light emitting region; and a wall formed so as to surround the periphery of the electrode pad portion and electrically insulated from the electrode pad portion.

SUMMARY

Aspects of non-limiting embodiments of the present disclosure relate to a light emitting device having a configuration in which a reduction in inductance of a circuit for driving a light emitting element array and a proximity arrangement between a light emitting element array and a light receiving element are easily compatible with each other, and an optical device and an information processing apparatus using the light emitting device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a light emitting device including: a substrate; a light emitting element array provided on the substrate, the light emitting element array including first and second side surfaces facing each other, and third and fourth side surfaces facing each other and connecting the first and second side surfaces; a driving element provided on the substrate on the first side surface side and driving the light emitting element array; a light receiving element provided on the substrate on the second side surface side and receiving light emitted from the light emitting element array; and a wiring member provided on the third and fourth side surface sides and extending from an upper surface electrode of the light emitting element array toward the outside of the light emitting element array.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the drawings.

A light emitting device, an optical device, and an information processing apparatus according to the exemplary embodiments will be described with reference to FIGS. 1 to 5. In the following exemplary embodiments, a portable information processing apparatus typified by a smartphone or the like is described as an example of an information processing apparatus.

Figure 1:
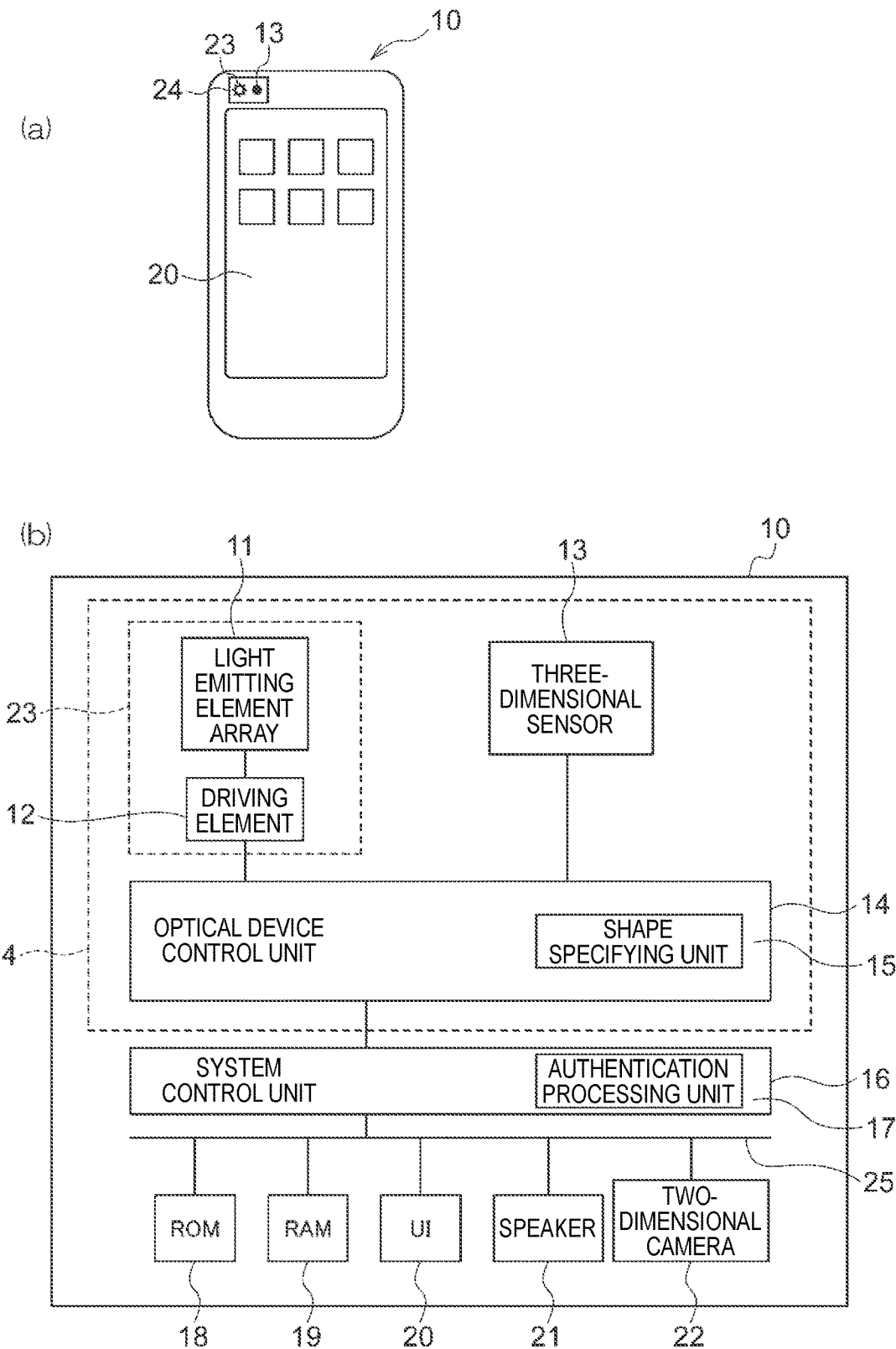
FIG. 1 is a view illustrating an information processing apparatus according to an exemplary embodiment, in which (a) is a view illustrating an example of an appearance, and (b) is a block diagram illustrating an example of an electrical configuration.

(a) of FIG. 1 illustrates an appearance of an information processing apparatus 10 according to the present exemplary embodiment. The information processing apparatus 10 includes an optical device 24 and a User Interface (UI) unit 20. The UI unit 20 is configured by integrating, for example, a display device that displays information to a user and an input device to which an instruction for information processing is input by an operation of the user. The display device is, for example, a liquid crystal display or an organic EL display, and the input device is, for example, a touch panel.

The optical device 24 includes a light emitting device 23 and a three-dimensional sensor 13. The light emitting device 23 is a portion that emits light toward an object to be measured in order to acquire a three-dimensional image. In the present exemplary embodiment, a human face will be illustrated as an example of an object to be measured. The two-dimensional sensor 13 receives reflected light in which the light emitted by the light emitting device 23 is reflected by the face and returned. The three-dimensional sensor 13 according to the present exemplary embodiment has a function of acquiring, for example, a three-dimensional image of a human face based on a so-called TOF (Time of Flight) method.

An electrical configuration of the information processing apparatus 10 will be described with reference to (b) of FIG. 1. As illustrated in (b) of FIG. 1, the information processing apparatus 10 includes a system control unit 16, a ROM 18, a RAM 19, a UI unit 20, an optical device 24, a speaker 21, and a two-dimensional camera 22. Of course, such configuration is merely an example, and a part of the configuration may be deleted or another configuration may be added in accordance with purposes, applications, and the like.

The system control unit 16 is, for example, a CPU, and the information processing apparatus 10 is configured as a computer including the system control unit 16, the ROM 18, the RAM 19, and the like. The system control unit 16 controls the entire information processing apparatus 10 as a system and includes an authentication processing unit 17. The ROM 18 includes a nonvolatile rewritable memory, for example, a flash memory. Then, a program or a literal accumulated in the ROM 18 is loaded into the RAM 19, and the system control unit 16 executes the program, whereby the information processing apparatus 10 operates, and various types of information processing are executed. The speaker 21 is a portion that emits a sound to the user, and the two-dimensional camera 22 is a normal camera that is used for photographing by the user. Each of the ROM 18, the RAM 19, the UI unit 20, the speaker 21, and the two-dimensional camera 22 is connected to the system control unit 16 via a bus 25.

As illustrated in (b) of FIG. 1, the optical device 24 includes the light emitting device 23, the three-dimensional sensor 13, and an optical device control unit 14. The optical device control unit 14 is connected to the system control unit 16, and controls the entire optical device 24. The optical device control unit 14 includes a shape specifying unit 15. Each of the light emitting device 23 and the three-dimensional sensor 13 is connected to the optical device control unit 14.

As shown in (b) of FIG. 1, the light emitting device 23 includes a light emitting element array 11 and a driving element 12. The light emitting element array 11 is a semiconductor light emitting element in which plural light emitting elements are disposed. The driving element 12 is a driver IC that drives the light emitting element array 11. The light emitting element array 11 is driven by the driving element 12 so as to emit, for example, pulse light (emission light pulse) of several tens of MHz to several hundreds of MHz. The light emitting device 23 is configured such that the three-dimensional sensor 13 receives the reflected light in which the light emitted from the light emitting element array 11 toward the object to be measured is reflected by the object to be measured.

Next, the relationship between the three-dimensional sensor 13 and the TOF will be described. The three-dimensional sensor 13 according to the present exemplary embodiment includes plural light receiving regions (pixels). The two-dimensional sensor 13 receives reflected light (light receiving pulse) from an object to be measured with respect to the emission light pulse from the light emitting element array 11, and accumulates charges corresponding to time until the light is received for each light receiving region. As an example, the three-dimensional sensor 13 is configured as a device having a CMOS structure in which each light receiving region includes two gates and charge accumulation units corresponding to the two gates. By alternately applying pulses to the two gates, the generated photoelectrons are transferred to one of the two charge accumulation units at high speed, and electric charges corresponding to the phase difference (that is, time difference) between the emission light pulse and the light receiving pulse are accumulated. A signal corresponding to the accumulated electric charge is output from the three-dimensional sensor 13 as a digital signal corresponding to an electric charge corresponding to a phase difference between the emission light pulse and the light receiving pulse for each light receiving region via an AD (Analog Digital) converter. That is, the three-dimensional sensor 13 outputs a signal corresponding to a time from when the light is emitted from the light emitting element array 11 to when the light is received by the three-dimensional sensor 13. The three-dimensional sensor 13 may include a lens for condensing light.

The shape specifying unit 15 included in the optical device control unit 14 acquires a digital value generated for each light receiving region of the three-dimensional sensor 13, calculates the distance to the object to be measured for each light receiving region, and specifies the three-dimensional shape of the object to be measured.

On the other hand, the authentication processing unit 17 included in the system control unit 16 performs authentication processing related to the use of the information processing apparatus 10 when the three-dimensional shape (specific result) of the object to be measured specified by the shape specifying unit 15 matches the three-dimensional shape previously accumulated in the ROM 18 or the like. The authentication processing related to the use of the information processing apparatus 10 is, for example, a processing as to whether or not to permit use of the own apparatus (information processing apparatus 10). For example, when the three-dimensional shape of the face as the object to be measured matches the face shape stored in the storage means such as the ROM 18, the use of the information processing apparatus 10 including various applications and the like provided by the information processing apparatus 10 is permitted.

The shape specifying unit 15 and the authentication processing unit 17 described above are configured by, for example, a program. In addition, an integrated circuit such as an ASIC or an FPGA may be used. Further, the shape specifying unit and the authentication processing unit may be constituted by software such as a program and an integrated circuit.

As described above, the light emitting element array 11 emits light for specifying the three-dimensional shape of the object to be measured and irradiates the object with light. That is, the light emitting element array 11 irradiates a predetermined measurement range with light of a predetermined density. The form of the plural light emitting elements included in the light emitting element array 11 is not particularly limited, and a vertical cavity surface emitting laser (VCSEL), a light emitting diode (LED), or the like is used, but in the present exemplary embodiment, a VCSEL is used as an example. Preferably, the light emitting element is a multi-mode VCSEL that is more likely to be higher in output than the single-mode VCSEL.

Figure 2:
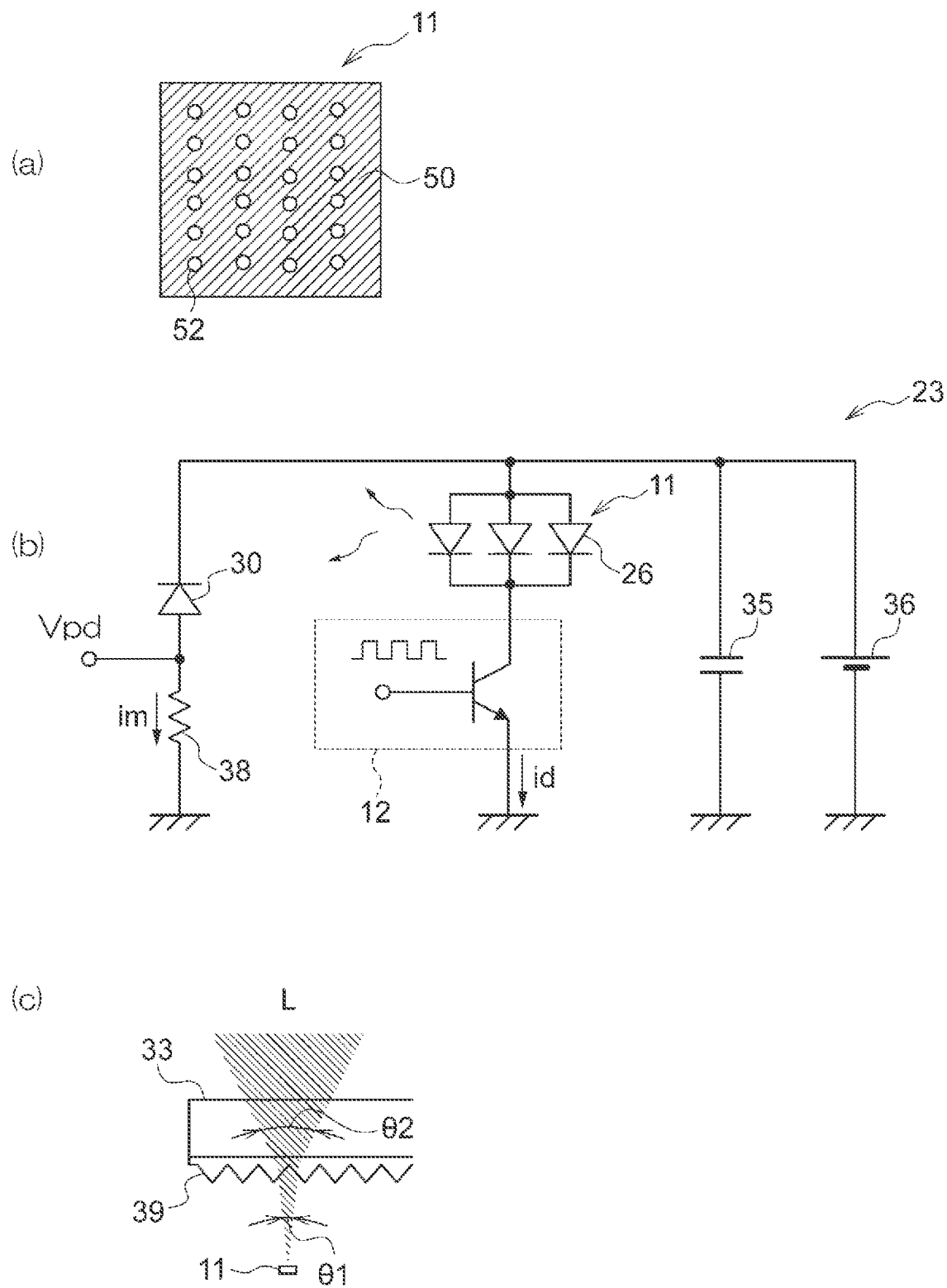
FIG. 2 is a view according to the exemplary embodiment, in which (a) is a plan view of the light emitting element array, (b) is a circuit diagram of the light emitting device, and (c) is a side cross-sectional view illustrating the function of a light diffusing plate.

The plural VCSELs (light emitting elements) are electrically connected in parallel to each other. The light output per VCSEL is, for example, set to 4 mW to 8 mW, and the number of VCSELs included in the light emitting element array 11 is, for example, 100 to 1000. (a) of FIG. 2 is a plan view of the light emitting element array 11. As shown in (a) of FIG. 2, the surface of the light emitting element array 11 is covered with a solid anode pattern 50 (electrode wiring) formed in a region excluding the light emission port 52 of each VCSEL, and has a connection region formed by a bonding wire of the anode pattern 50 at an end portion along each side of the light emitting element array 11. The semiconductor substrate of the light emitting element array 11 is, for example, an n-type GaAs substrate, and a cathode electrode is disposed on the rear surface side of the substrate. The anode pattern 50 is an example of the "upper surface electrode" according to the present invention.

A driving circuit of the light emitting element array 11 will be described with reference to (b) of FIG. 2. (b) of FIG.

2 shows a circuit diagram of the light emitting device 23. As shown in (b) of FIG. 2, the light emitting device 23 includes a light emitting element array 11, a driving element 12, a light quantity monitoring light receiving element 30, a resistor 38, a capacitor 35, and a power source 36.

As described above, the light emitting element array 11 is configured by connecting the plural VCSELs 26 in parallel. A current source included in the driving element 12 is connected to the VCSELs 26 connected in parallel, and a driving current id is supplied from the current source.

The light quantity monitoring light receiving element 30 has a function of monitoring the light quantity of the light emitting element array 11. That is, the output signal from the light quantity monitoring light receiving element 30 is used to control the light emitting element array 11 to maintain a predetermined light quantity and emit the light. The light quantity monitoring light receiving element 30 is, for example, a photodiode (PD) made of silicon or the like that outputs an electric signal corresponding to the light receiving quantity. That is, the light quantity monitoring light receiving element 30 receives a part of the light emitted from the light emitting element array 11 and outputs the monitor current im corresponding to the light receiving quantity. The monitor current im is converted into a voltage by the resistor 38, and is output as a monitor voltage Vpd. The monitor voltage Vpd is sent to a light quantity monitoring circuit provided inside the driving element 12 (not shown), and the light quantity monitoring circuit monitors the light quantity emitted from the light emitting element array 11 based on the monitor voltage Vpd. The light quantity monitoring light receiving element 30 is an example of a "circuit element" according to the present invention.

The power source 36 is a power source for operating the light emitting element array 11 and the light quantity monitoring light receiving element 30, and the capacitor 35 has a function as a current source as will be described later. The power source 36 includes, for example, a power supply layer and a ground layer provided inside a wiring board 27.

Figure 3:
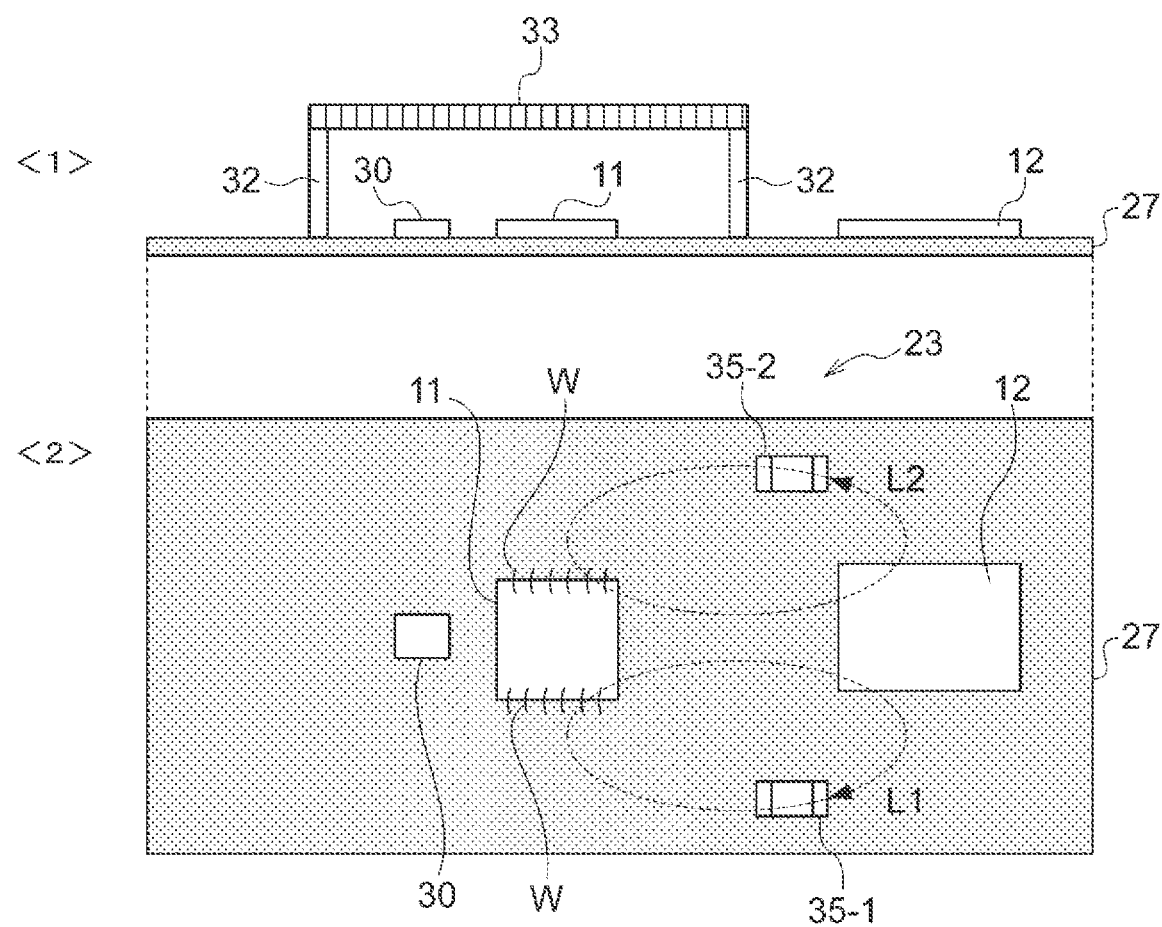
FIG. 3 is a side cross-sectional view and a plan view of the light emitting device according to the exemplary embodiment.

Next, the configuration of the light emitting device 23 according to the present exemplary embodiment will be described with reference to FIG. 3. <1> in FIG. 3 is a side cross-sectional view of the light emitting device 23, and <2> in FIG. 3 is a plan view. As illustrated in FIG. 3, the light emitting device 23 includes the light emitting element array 11, the light quantity monitoring light receiving element 30, a light diffusing plate 33, a spacer 32, and the driving element 12 mounted on the wiring board 27. The wiring board 27 is formed of, for example, a glass epoxy board on which wiring for connecting the elements is formed. The light diffusing plate 33 is an example of a "light diffusing member" according to the present invention.

Here, in the TOF method, it is necessary to irradiate a predetermined range on the irradiation surface (for example, several meters ahead) of the object to be measured with a uniform laser beam. Therefore, the light diffusing plate 33 has a function of diffusing emission light L emitted from the light emitting element array 11 and enlarging the emission angle. That is, as illustrated in (c) of FIG. 2, the light diffusing plate 33 includes an uneven member 39, and enlarges the emission angle of the emission light L emitted from the light emitting element array 11 at the emission angle θ1 to θ2 (>θ1). More specifically, the light diffusing plate 33 includes, for example, an uneven member 39 formed of a resin layer in which unevenness for diffusing light are formed on one surface of a glass base material whose both surfaces are parallel and flat. Then, due to the unevenness, the emission light L emitted from the light emitting element array 11 is further diffused and irradiated to the outside.

The spacer 32 is disposed between the wiring board 27 and the light diffusing plate 33, supports the light diffusing plate 33, and positions the light diffusing plate 33 such that the distance from the light emitting element array 11 is a predetermined distance. Further, in the present exemplary embodiment, the light diffusing plate 33 and the spacer 32 seal the light emitting element array 11 or the like, thereby preventing dust, moisture, or the like. The spacer 32 is made of, for example, ceramic or a resin material.

The light diffusing plate 33 further has a function of guiding a part of the light emitted from the light emitting element array 11 to the light quantity monitoring light receiving element 30. That is, the light diffusing plate 33 is provided so as to cover the light emitting element array 11 and the light quantity monitoring light receiving element 30, and is disposed such that the light reflected by the back surface of the light diffusing plate 33 without passing through the light diffusing plate 33 is received by the light quantity monitoring light receiving element 30. As the distance from the light emitting element array 11 increases, the light receiving quantity by the light quantity monitoring light receiving element 30 decreases, and therefore, it is preferable that the light emitting element array 11 and the light quantity monitoring light receiving element 30 be disposed close to each other. The light quantity monitoring light receiving element 30 is also used to detect that the light emitted from the light emitting element array 11 is directly irradiated to the outside due to detachment or breakage of the light diffusing plate 33.

Incidentally, in the VCSEL array used for measuring the TOF, for example, there is a case where it is required to raise the large current of 2 A at a rise time of 1 ns or less, or to drive it at a high frequency of about 100 MHz, and therefore it is important to reduce the inductance component of the driving circuit. As one of methods for reducing the inductance component, it is conceivable to increase the number of bonding wires as much as possible. However, the number of bonding wires may be limited in consideration of the disposition relationship with other elements (light quantity monitoring light receiving element 30, driving element 12, etc.). Therefore, in the present exemplary embodiment, the inductance component of the driving circuit is reduced in consideration of the disposition relationship with other elements. In order to reduce the inductance of the driving circuit, it is important to shorten the current loop including the capacitor 35 serving as a current source, the light emitting element array 11, and the driving element 12. <2> in FIG. 3 illustrates a case where two capacitors 35-1, 35-2 are disposed as the capacitor 35, and two current loops L1 and L2 are formed.

Figure 4:
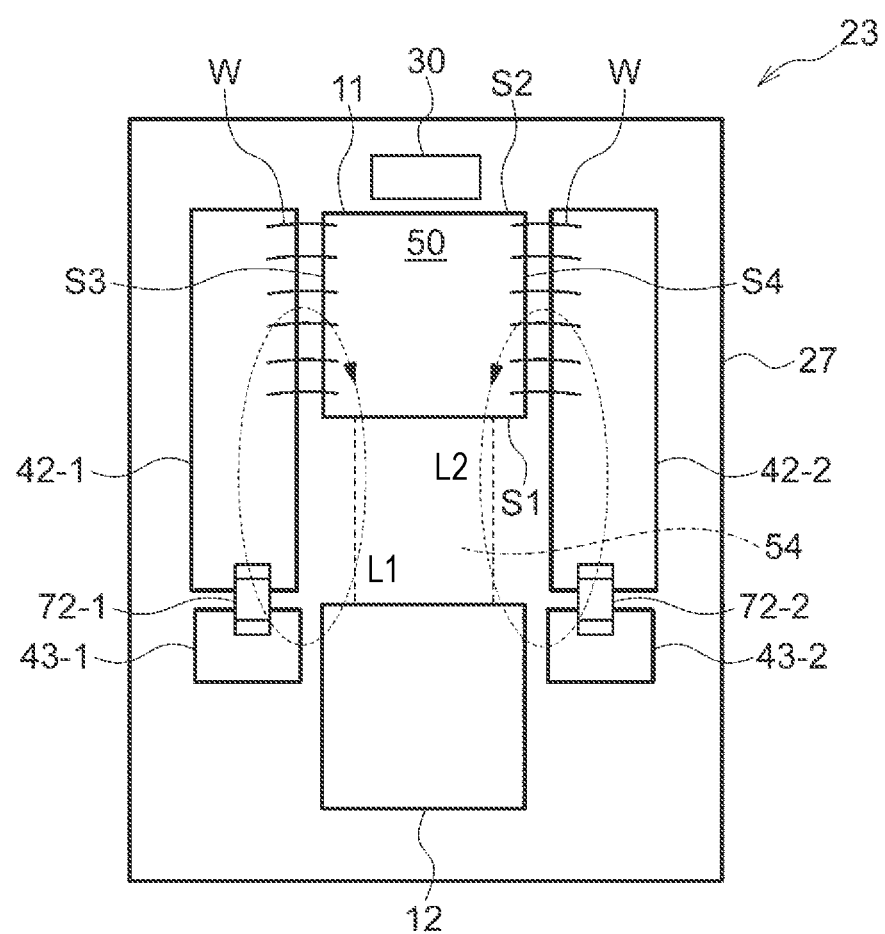
FIG. 4 is a plan view illustrating an example of the configuration of the light emitting device according to the exemplary embodiment.

The light emitting device 23 according to the present exemplary embodiment will be described in detail with reference to FIG. 4. As illustrated in FIG. 4, the light emitting device 23 includes the wiring board 27, the light emitting element array 11 mounted on the wiring board 27, the driving element 12, the light quantity monitoring light receiving element 30, and capacitors 72-1, 72-2. Conductive patterns 42-1, 42-2, 43-1, and 43-2 are formed on the wiring board 27. A conductive pattern (not shown) is also formed on the wiring board 27 at each position of the light emitting element array 11, the driving element 12, and the light quantity monitoring light receiving element 30, and the back surfaces of the light emitting element array 11, the driving element 12, and the light quantity monitoring light receiving element 30 are connected to the conductive pattern. Further, a cathode pattern 54 for connecting the cathode of the light emitting element array 11 and the driving element 12 is formed on the rear surface of the wiring board 27. As illustrated in FIG. 4, the shape of the light quantity monitoring light receiving element 30 may be a rectangular shape in which the side facing the light emitting element array 11 is longer. With such a shape, compared to the case of a square shape, even when the light receiving area is the same, the light receiving area at a position closer to the light emitting element array 11 is increased, and thus the light receiving quantity is increased.

As illustrated in FIG. 4, the light emitting element array 11 includes a first side surface S1, a second side surface S2, a third side surface S3, and a fourth side surface S4. A bonding wire W is connected between the end portion of the anode pattern 50 on the third side surface S3 side and the conductive pattern 42-1, and a bonding wire W is connected between the end portion of the anode pattern 50 on the fourth side surface S4 side and the conductive pattern 42-2. The capacitor 72-1 is connected between the conductive patterns 42-1, 43-1, and the capacitor 72-2 is connected between the conductive patterns 42-2, 43-2. It is not always necessary to provide both of the capacitors 72-1, 72-2, and only one of the capacitors 72-1, 72-2 may be provided. The bonding wire W is an example of a "wiring member" according to the present invention.

In order to drive the light emitting element array at a high speed, it is desirable to reduce the inductance between the light emitting element array and the wiring board (hereinafter referred to as "inductance of circuit"). In an element having a structure such as the light emitting element array 11 according to the present exemplary embodiment, since the ratio of the inductance of the bonding wire to the inductance of the circuit is large, it is necessary to first reduce the inductance of the bonding wire.

In the case where the outer shape of the light emitting element array is rectangular, it is conceivable to strike the bonding wires in four directions to increase the number of bonding wires and reduce the inductance component. However, there is a member that is originally intended to be disposed near the light emitting element array, such as a driving circuit or a light quantity monitoring light receiving element, and it may be difficult to strike the bonding wire in all directions. In particular, in the configuration such as the light emitting device 23 according to the present exemplary embodiment in which the light diffusing plate 33 or the like that diffuses the light emitted from the light emitting element array 11 is provided, in order to detect the light quantity of the light emitted from the light emitting element array 11 by the light quantity monitoring light receiving element 30, it is preferable to dispose the light emitting element array 11 and the light quantity monitoring light receiving element 30 close to each other.

Under the above background, by adopting a configuration as illustrated in FIG. 4, that is, a configuration in which the bonding wire W is connected from two directions of the light emitting element array 11, the light emitting device 23 according to the present exemplary embodiment realizes the light emitting device 23 having a configuration in which both the reduction of the inductance of the circuit for driving the light emitting element array 11 and the proximity disposition of the light emitting element array 11 and the light quantity monitoring light receiving element 30 are likely to be achieved. The reason will be described below with reference to FIG. 5.

Figure 5:
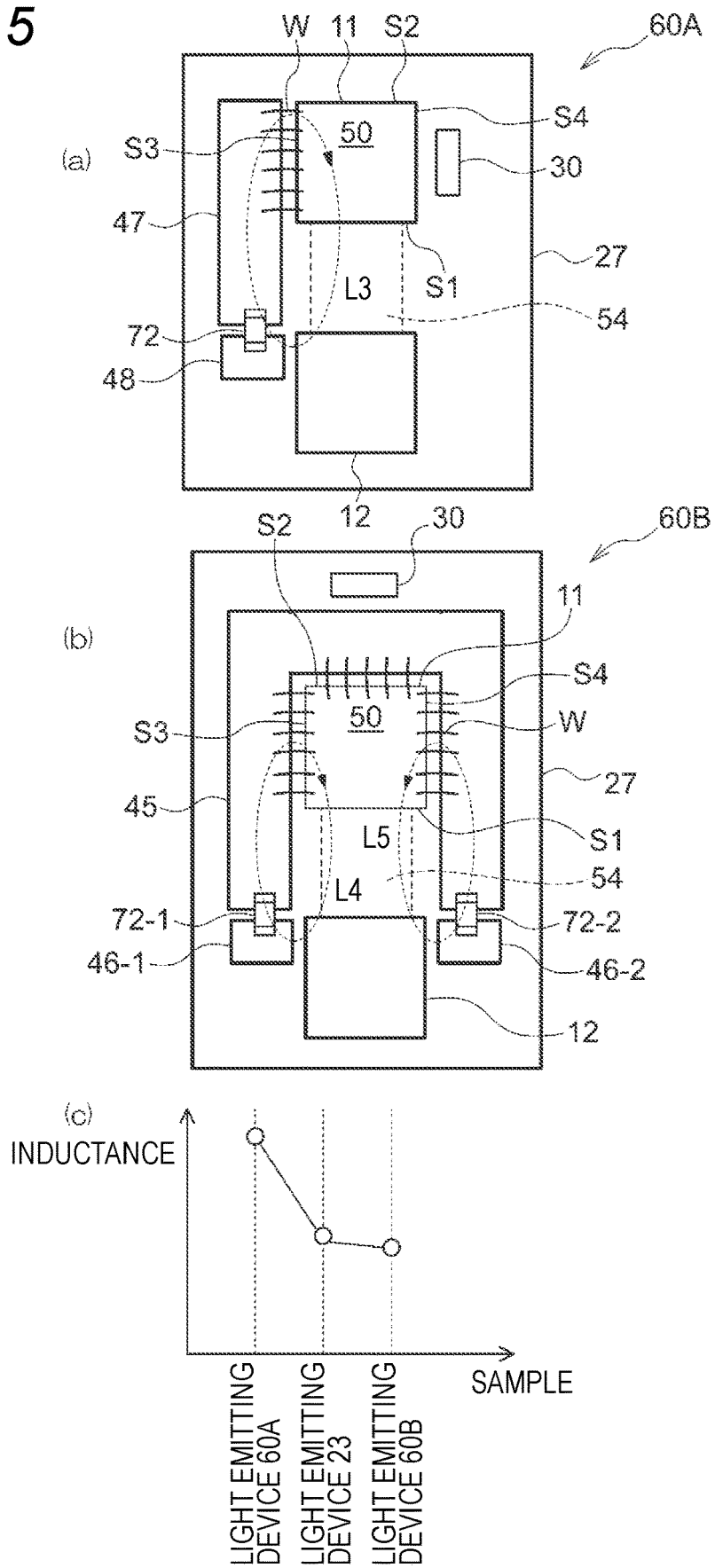
FIG. 5 is a drawing including (a) a plan view illustrating a configuration of a light emitting device according to a first comparative example, (b) a plan view illustrating a configuration of a light emitting device according to a second comparative example, and (c) a graph comparing an inductance of a bonding wire of each light emitting device.

(a) of FIG. 5 illustrates a plan view of a light emitting device 60A according to a first comparative example, and (b) of FIG. 5 illustrates a light emitting device 60B according to a second comparative example. (c) of FIG. 5 is a diagram comparing the inductance (that is, a circuit inductance) between the light emitting element array 11 and the wiring board 27 in the light emitting device 23 according to the present exemplary embodiment with the light emitting devices 60A, 60B according to the comparative example. In the following description, the same components as those of the light emitting device 23 in FIG. 5 are denoted by the same reference numerals, and detailed description thereof is omitted.

As illustrated in (a) of FIG. 5, in the light emitting device 60A according to a comparative example, conductive patterns 47, 48 are formed on the wiring board 27, and the light emitting element array 11, the driving element 12, the light quantity monitoring light receiving element 30, and the capacitor 72 are disposed. The conductive pattern 47 faces the third side surface S3 of the light emitting element array 11, and the bonding wire W is connected between the anode pattern 50 of the light emitting element array 11 and the conductive pattern 47. The light quantity monitoring light receiving element 30 is mounted at a position facing the fourth side surface S4. Further, the capacitor 72 is connected between the conductive patterns 47, 48. That is, the current loop in the light emitting device 60A is one of the current loops L3.

As illustrated in (b) of FIG. 5, in the light emitting device 60B according to the comparative example, the conductive patterns 45, 46-1 and 46-2 are formed on the wiring board 27, and the light emitting element array 11, the driving element 12, the light quantity monitoring light receiving element 30, and the capacitors 72-1, 72-2 are disposed. The conductive pattern 45 faces three surfaces of the second side surface S2, the third side surface S3 and the fourth side surface S4 of the light emitting element array 11. Therefore, the bonding wires W between the anode pattern 50 of the light emitting element array 11 and the conductive pattern 45 are connected in three directions. The light quantity monitoring light receiving element 30 is mounted at the second side surface S2 side. The capacitor 72-1 is connected between the conductive patterns 45, 46-1, and the capacitor 72-2 is connected between the conductive patterns 45, 46-2. That is, the current loop in the light emitting device 60B is two of the current loops L4, L5.

The inductance of each circuit of the light emitting devices 23, 60A and 60B will be discussed with reference to (c) of FIG. 5. That is, in the light emitting device 60A according to the comparative example, the light emitting element array 11 and the light quantity monitoring light receiving element 30 can be disposed close to each other, but since the wire bonding is done in only one direction, the inductance of the circuit is large. On the other hand, in the light emitting device 60B according to the comparative example, since the bonding wire W can be connected in three directions, the inductance of the circuit decreases. However, in the light emitting device 60B, the light emitting element array 11 and the light quantity monitoring light receiving element 30 cannot be disposed close to each other.

Therefore, in the present exemplary embodiment, in a configuration in which the light emitting element array 11, the driving element 12 and the capacitors 72 (72-1, 72-2) are close to each other, the bonding wire W at the second side surface S2 side does not contribute much to the reduction in the inductance of the circuit, and the bonding wire W at the third side surface S3 and the fourth side surface S4 significantly contributes to reducing the inductance of the circuit. (c) of FIG. 5 illustrates the inductance of the circuits of the light emitting devices 23, 60A and 60B. As illustrated in (c) of FIG. 5, the inductance of the circuit decreases in the order of the light emitting devices 60A, 23 and 60B, but the difference between the inductance of the circuit of the light emitting device 23 and the inductance of the circuit of the light emitting device 60B is smaller than the difference between the inductance of the circuit of the light emitting device 60A and the inductance of the circuit of the light emitting device 23. This is due to the second side surface S2 is farther from the current loops L4, L5 as compared with the third side surface S3 and the fourth side surface S4. That is, since the second side surface S2 is separated from the current loop originally formed by the light emitting element array 11, the driving element 12, and the capacitors 72 (72-1, 72-2), the influence of the inductance component caused by the bonding wire W connected to the second side surface S2 side is small. Therefore, even when the bonding wire W connected to the second side surface S2 side is deleted, an increase in the inductance component is relatively small.

Therefore, in contrast to the light emitting devices 60A and 60B according to the comparative example, in the light emitting device 23 according to the comparative example, the bonding wire W is not connected to the second side surface S2 side, and the light quantity monitoring light receiving element 30 is disposed at the position. As a result, the proximity disposition between the light emitting element array and the light receiving element is realized while suppressing an increase in the inductance component of the circuit. Hereinafter, the features of the light emitting device 23 will be described in more detail.

At least one of the capacitors 72-1, 72-2 may be provided closer to the drive element 12 than the second side surface S2. As a result, the power source is more stabilized than in the case where the capacitors 72-1, 72-2 are provided at the side farther from the drive element 12 than the second side surface S2.

At least one of the capacitors 72-1, 72-2 may be provided at the side closer to the light emitting element array 11 than the position of the end surface farthest from the light emitting element array 11 among the end surfaces constituting the driving element 12. As a result, compared to the case where the capacitors 72-1, 72-2 are provided at the side farther from the end surface farthest from the light emitting element array 11 of the end surfaces constituting the driving element 12, an effect that the current path (current loop) for driving the light emitting element array 11 is likely to be shortened is achieved.

As illustrated in FIG. 4, each of the capacitors 72-1, 72-2 may be disposed separately on the third side surface S3 side and the fourth side surface S4 side with respect to a straight line connecting the center of the light emitting element array 11 and the center of the driving element 12. As a result, compared to the configuration in which the wiring member is disposed only on the one side surface side, it is likely to equalize the path length of the current through the wiring member on the third side surface S3 side and the path length of the current through the wiring member on the fourth side surface S4 side.

The distance between the second side surface S2 and the light quantity monitoring light receiving element 30 may be shorter than the distance between the first side surface S1 and the second side surface S2. As a result, compared to the case where the distance is longer than the distance between the first side surface S1 and the second side surface S2, the light receiving quantity by the light quantity monitoring light receiving element 30 increases in a case where the light diffusing member is provided in the light emitting path of the light emitting element array 11.

The distance between the second side surface S2 and the light quantity monitoring light receiving element 30 may be shorter than the length corresponding to the length of the bonding wire W. As a result, compared to the case where the distance is longer than the distance corresponding to the length of the bonding wire W, the distance between the light emitting element array 11 and the light quantity monitoring light receiving element 30 is closer. Therefore, the light receiving quantity of the light receiving element increases in a case where the light diffusing member is provided in the light emitting path of the light emitting element array 11.

The bonding wire extending from the anode pattern 50 of the light emitting element array 11 toward the outside of the light emitting element array 11 is preferably not provided between the first side surface S1 and the driving element 12. Compared to the configuration in which the bonding wire is provided between the first side surface S1 and the driving element 12, it is likely to shorten the current path for driving the light emitting element array 11.

The shape of the region in which the plural VCSELs 26 are arranged in the light emitting element array 11 may be shorter in the length along the first side surface S1 and the second side surface S2 than the length in the direction along the third side surface S3 and the fourth side surface S4. As a result, compared to the case where the length along the first side surface S1 and the second side surface S2 is longer, the increase in the inductance due to the absence of the bonding wire W at the second side surface S2 side is suppressed.

The light diffusing plate 33 may be provided at a position overlapping the light quantity monitoring light receiving element 30 in a plan view. As a result, compared to a case where the light diffusing plate is not provided at a position overlapping the light quantity monitoring light receiving element 30, the light receiving quantity by the light quantity monitoring light receiving element 30 with respect to the light emitted from the light emitting element array 11 and reflected by the light diffusing plate 33 increases.

In the present exemplary embodiment, each element of the light emitting element array 11, the light quantity monitoring light receiving element 30, and the driving element 12 is directly disposed on the wiring board 27. For example, a base material for heat dissipation or the like may be disposed on the wiring board 27, and each element may be disposed on the base material for heat dissipation. That is, each element may be disposed indirectly on the wiring board 27. Furthermore, a part of each element may be directly disposed on the wiring board 27, and the remaining elements may be disposed on a base material for heat dissipation.

Although the present invention has been described in detail with reference to specific embodiments, it will be apparent to those skilled in the art that various changes and modifications can be made without departing from the spirit and scope of the present invention.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

REFERENCE SIGNS LIST

10 Information processing apparatus
11 Light emitting element array
12 Driving element
13 Three-dimensional sensor
14 Optical device control unit
15 Shape specifying unit
16 System control unit
17 Authentication processing unit
18 ROM
19 RAM
20 UI unit
21 Speaker
22 Two-dimensional camera
23 Light emitting device
24 Optical device
25 Bus
26 VCSEL
27 Wiring board
30 Light quantity monitoring light receiving element
32 Spacer
33 Light diffusing plate
35, 35-1, 35-2 Capacitor
36 Power source
38 Resistor
39 Uneven member
42-1, 42-2, 43-1, 43-2, 45, 46-1, 46-2, 47, 48 Conductive pattern
50 Anode pattern
52 Light emission port
54 Cathode pattern
60A, 60B Light emitting device
72, 72-1, 72-2 Capacitor
id Driving current
im Monitor current
L1, L2, L3, LA, L5 Current loop
S1 First side surface
S2 Second side surface
S3 Third side surface
S4 Fourth side surface
Vpd monitor voltage
W Bonding wire
L Emission light θ1, θ2 Emission angle

What is claimed is:

1. A light emitting device comprising:
a substrate;
a light emitting element array provided on the substrate, the light emitting element array having first and second side surfaces facing each other, and third and fourth side surfaces facing each other and connecting the first and second side surfaces;
a driving element provided on the substrate at a side of the first side surface and driving the light emitting element array;
a light receiving element provided on the substrate at a side of the second side surface and receiving light emitted from the light emitting element array; and
a wiring member provided at a side of the third side surface and at a side of the fourth side surface and extending from an upper surface electrode of the light emitting element array toward an outside of the light emitting element array.

2. The light emitting device according to claim 1, further comprising a capacitor that is provided at a side closer to the driving element than the second side surface and supplies an electric current to the light emitting element array.

3. The light emitting device according to claim 2, wherein the capacitor is provided at a side closer to the light emitting element array than a position of an end surface that is farthest from the light emitting element array among end surfaces constituting the driving element.

4. The light emitting device according to claim 3, which comprises a plurality of the capacitors, wherein each of the plurality of capacitors is separately disposed at a side of the third side surface and a side of the fourth side surface with respect to a virtual straight line connecting a center of the light emitting element array and a center of the driving element.

5. The light emitting device according to claim 4, wherein a wiring member extending from an upper surface electrode of the light emitting element array toward the light receiving element is not provided between the second side surface and the light receiving element.

6. The light emitting device according to claim 3, wherein a wiring member extending from an upper surface electrode of the light emitting element array toward the light receiving element is not provided between the second side surface and the light receiving element.

7. The light emitting device according to claim 2, wherein a wiring member extending from an upper surface electrode of the light emitting element array toward the light receiving element is not provided between the second side surface and the light receiving element.

8. The light emitting device according to claim 1, further comprising a plurality of capacitors that supplies an electric current to the light emitting element array,
wherein each of the plurality of capacitors is separately disposed at a side of the third side surface and a side of the fourth side surface with respect to a virtual straight line connecting a center of the light emitting element array and a center of the driving element.

9. The light emitting device according to claim 8, wherein a wiring member extending from an upper surface electrode of the light emitting element array toward the light receiving element is not provided between the second side surface and the light receiving element.

10. The light emitting device according to claim 1, wherein a wiring member extending from an upper surface electrode of the light emitting element array toward the light receiving element is not provided between the second side surface and the light receiving element.

11. The light emitting device according to claim 1, wherein a distance between the second side surface and the light receiving element is shorter than a distance between the first side surface and the second side surface.

12. The light emitting device according to claim 1, wherein a distance between the second side surface and the light receiving element is shorter than a length of the wiring member.

13. The light emitting device according to claim 1, wherein a wiring member extending from an upper surface electrode of the light emitting element array toward an outside of the light emitting element array is not provided between the first side surface and the driving element.

14. The light emitting device according to claim 1, wherein the light emitting element array comprises a plurality of light emitting elements, and a shape of a region in which the plurality of light emitting elements are arranged in the light emitting element array is shorter in a length along the first and second side surfaces than a length along the third and fourth side surfaces.

15. The light emitting device according to claim 14, wherein the plurality of light emitting elements are connected in parallel to each other.

16. The light emitting device according to claim 1, further comprising a light diffusing member that is disposed on a light emitting path of the light emitting element array and diffuses the light emitted from the light emitting element array toward an outside.

17. The light emitting device according to claim 16, wherein the light diffusing member is provided at a position overlapping the light receiving element in a plan view.

18. An optical device comprising:
the light emitting device according to claim 1; and
a three-dimensional sensor that receives reflected light emitted from the light emitting element array included in the light emitting device and reflected by an object to be measured,
wherein the three-dimensional sensor outputs a signal corresponding to a time from when light is emitted from the light emitting element array to when the light is received by the three-dimensional sensor.

19. An information processing apparatus comprising:
the optical device according to claim 18; and
a shape specifying unit that specifies a three-dimensional shape of the object to be measured based on reflected light emitted from the light emitting element array included in the optical device and reflected by the object to be measured and received by the three-dimensional sensor included in the optical device.

20. The information processing apparatus according to claim 19, further comprising an authentication processing unit that performs authentication processing on a use of the information processing apparatus based on a specified result by the shape specifying unit.

* * * * *